United States Patent [19]

Tice et al.

[11] 4,013,925

[45] Mar. 22, 1977

[54] OVERLOAD PROTECTION CIRCUIT FOR VOLTAGE REGULATOR

[75] Inventors: Lee Don Tice, Rolling Meadows; David Michael Drury, Mundelein, both of Ill.

[73] Assignee: Motorola, Inc., Schaumburg, Ill.

[22] Filed: Nov. 10, 1975

[21] Appl. No.: 630,561

[52] U.S. Cl. .................................... 361/18; 361/91

[51] Int. Cl.[2] .......................................... H02H 7/20

[58] Field of Search ........ 317/33 VR, 36 TD, 33 R, 317/31; 323/9, 22 T, 38, 4

[56] References Cited

UNITED STATES PATENTS

| | | | |
|---|---|---|---|
| 3,109,980 | 11/1963 | Wiley | 317/33 VR |
| 3,125,715 | 3/1964 | Brooks | 317/33 VR X |
| 3,327,201 | 6/1967 | Brantley | 317/33 VR X |
| 3,432,726 | 3/1969 | Meyer et al. | 317/33 VR X |
| 3,527,997 | 9/1970 | Nercessian | 317/33 VR X |
| 3,534,249 | 10/1970 | Neill et al. | 317/33 VR X |
| 3,703,679 | 11/1972 | Heidt | 317/33 VR X |
| 3,714,512 | 1/1973 | Grabowski | 317/33 VR |
| 3,748,569 | 7/1973 | Frank | 317/33 VR X |

*Primary Examiner*—J D Miller
*Assistant Examiner*—Patrick R. Salce
*Attorney, Agent, or Firm*—Margaret Marsh Parker; James W. Gillman

[57] ABSTRACT

When the load current of a voltage regulator rises above a safe value for sustained operation, a limiting circuit is activated to prevent further rise. At the same time, a capacitor in a timing circuit is being charged so that if the overload condition continues beyond a predetermined amount, the capacitor voltage will trigger a latching circuit to shut off the regulator. The regulator is reset by merely turning off the supply long enough to allow the capacitor to discharge.

4 Claims, 1 Drawing Figure

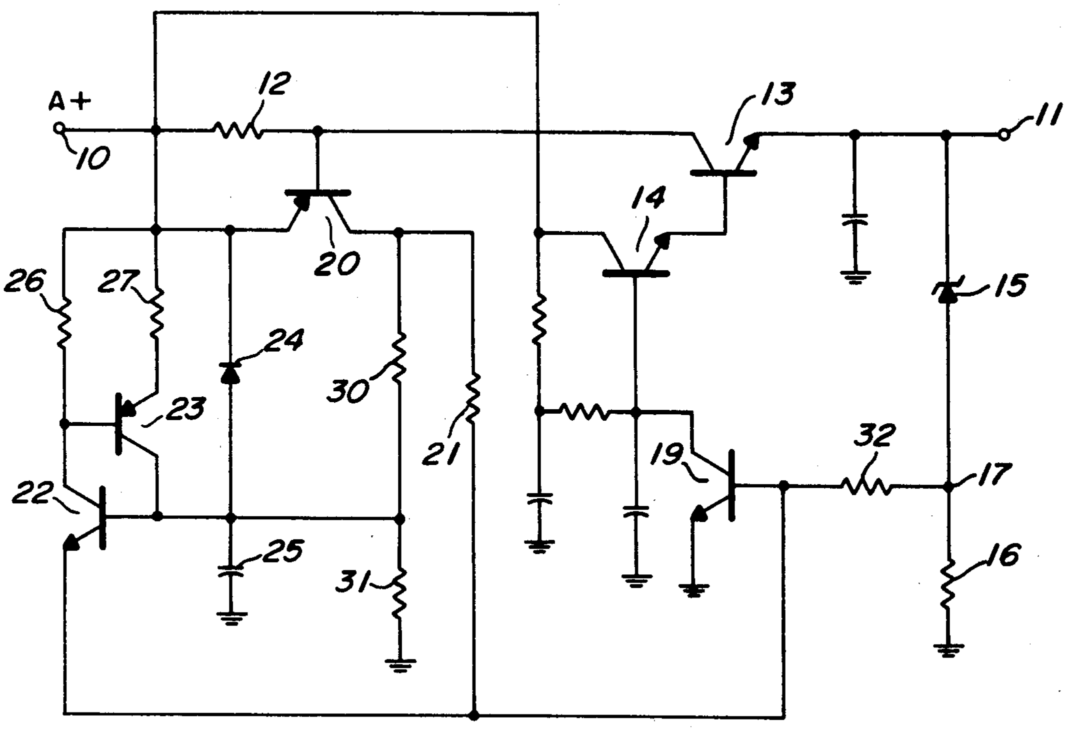
A+
10
12
13
11
20
14
26
27
24
15
30
23
21
32
19
17
22
25
16
31

OVERLOAD PROTECTION CIRCUIT FOR VOLTAGE REGULATOR

BACKGROUND OF THE INVENTION

This invention relates to the field of voltage regulation and more particularly to the prevention of both overload damage and unnecessary power supply shut down.

Since a continuous overload as well as a short circuit can destroy a voltage regulator, these systems have been developed to avoid such damage. Typically, these systems use one of two main approaches, current limiting or regulative cut off, with some means of current limiting being the most common. However, the concept of limiting as a solution has a serious flaw in that the system must limit at some margin above the desired level. Thus, unless all components have large safety factors, some portion of the regulator will almost certainly be damaged if a moderate overload condition continues for an extended period. The failure of one component, of course, almost inevitably leads to other failures.

To avoid this possibility, various systems have been devised to cut off supply when overload condition is sensed. This approach, however, usually produces annoyance from unnecessary shut downs triggered by momentary overloads.

SUMMARY OF THE INVENTION

It is an object of this invention to provide overload protection for a voltage regulator.

It is a more particular object to provide such protection from sustained overloads without interrupting service during momentary overloads.

The above objectives are achieved in the present invention by an improved voltage regulator circuit which provides load limiting to a non-catastrophic level and, at the same time, provides time sensing so that if a sustained over load condition occurs the regulator is cut off, but momentary overloads do not trigger cut off.

A transistor in the regulator circuit senses a voltage proportional to the output voltage and maintains the output voltage very close to the desired value. If an overload occurs, the current is limited as usual but, at the same time, a timing circuit begins measuring the length and amount of the overload. At a predetermined level of charge on a capacitor in the timing circuit, a latching circuit shuts down the regulator and keeps it off until the unit is turned off and back on again. If the cause of the overload is still present, the unit will again shut off.

BRIEF DESCRIPTION OF THE DRAWING

These and other objects and features of the invention will be more fully understood from the following detailed description in which the single FIGURE is a schematic diagram of a current overload protection circuit for a voltage regulator according to the present invention.

DESCRIPTION OF A PREFERRED EMBODIMENT

The circuit shown in the schematic diagram forms a voltage regulator which could be used with any DC powered communication device, e.g., a small radio. The regulator has three possible operating conditions, normal load, momentary overload, and continuous overload. Under normal operating conditions, a 12-volt battery or other DC supply is connected to an input terminal 10 of the regulator circuit and is coupled to a loading circuit via output terminal 11 and through a sensing resistor 12 and a transistor 13. A transistor 14 is coupled from the terminal 10 to the base of the transistor 13. A zener diode 15 and a series resistor 16 are connected across the output with a tap at a point 17. A transistor 19 is coupled between the base of the transistor 14 and the point 17. The transistors 13, 14 and 19 regulate the voltage on the point 17 and thus on the terminal 11, the latter voltage being substantially the sum of the zener diode 15 voltage and the transistor 19 voltage.

The base of a transistor 20 is coupled to the resistor 12 and the transistor 13 collector. The emitter of the transistor 20 is coupled to the terminal 10 and the collector of the transistor 20 is coupled through a resistor 21 to the base of the transistor 19. If the current in the load increases beyond a predetermined value, an emitter-base voltage drop appears across the transistor 20, turning the transistor 20 on, and current begins to flow through the resistor 21 and into the base of the transistor 19 which then shunts the transistor 14 and limits the load current.

Also coupled to the input terminal 10 and the transistor 20 is a timing-latching circuit, including two transistors 22, 23, a diode 24, a charging capacitor 25, and resistors 26, 27, 30 and 31. The transistors are connected back to back, the emitter of the transistor 23 coupled to the terminal 10 through the resistor 27, and the base of transistor 23 and the collector of the transistor 22 are coupled to terminal 10 through the resistor 26. The emitter of the transistor 22 is coupled to the base of the transistor 19. The base of the transistor 22 and collector of the transistor 23 are coupled through the capacitor 25 and the resistor 31 to ground, through the diode 24 to the emitter of the transistor 20, and through the resistor 30 to the collector of the transistor 20.

When the voltage on the collector of the transistor 20 starts to increase due to a severe overload, the capacitor 25 begins to charge. If the overload condition exists long enough, the voltage across the capacitor 25 will reach the threshold voltage for the latch formed by transistors 22 and 23. Current will then flow through the resistor 27 and the latching transistors to the base of the transistor 19 and saturate the transistor. Transistors 14 and 13 will then be cut off and remain off until the circuit is unlatched. A resistor 32 may be inserted between the base of transistor 19 and the zener diode 15 for protection of the transistor in the event the full supply voltage should be applied to the terminal 11.

The circuit can experience or even be turned on to a shorting condition for up to 500 milliseconds without latching. This brief type of short often occurs during servicing and it is very annoying to the service man to have the unit cut off repeatedly. If latching does occur, the unit is merely turned off, then turned on again to resume operation. If the unit should continue to turn off repeatedly, a short of a more permanent type is indicated.

A circuit has been described which provides current limiting, overload timing and latching functions for a voltage regulator circuit. It is evident that other alternatives and variations of the invention would be apparent to those skilled in the art and it is intended to include all such alternatives and variations as fall within the spirit and scope of the appended claims.

What is claimed is:

1. In a voltage supply for providing output to a loading circuit, an overload protection circuit comprising in combination:

an input terminal coupled to a source of DC voltage;

an output terminal coupled to the loading circuit;

a common terminal;

voltage regulating means coupled across the output means and having first diode means and first resistor means connected in series across the output and common terminals, first transistor means having a base-emitter circuit coupled in parallel with the first resistor means, second and third transistor means in a Darlington connection coupled to the output terminal, the first transistor means forming an amplifier coupled to the Darlington-connected transistor means and to the common terminal for providing an output voltage which is substantially the sum of the voltages on the first diode means and the amplifier;

limiting means coupled to the input terminal and to the voltage regulating means and comprising a sensing resistor coupled between the input terminal and the collector of the second transistor means, fourth transistor means having an emitter coupled to the input terminal, a base coupled to the collector of the second transistor means and a collector coupled through a second resistor to the base of the transistor amplifier for causing the fourth transistor to conduct when an excessive current flows through the sensing resistor, thereby shunting the third transistor for maintaining the current in the loading circuit at substantially a predetermined level;

latching means coupled to the input terminal and including fifth and sixth transistor means connected back to back and coupled to the base of the first transistor means, a timing capacitor coupled between the fifth transistor base and the common terminal, third resistor means coupled between the collector of the fourth transistor means and the timing capacitor for charging the capacitor when the fourth transistor is conducting and for causing the fifth and sixth transistor means to conduct when the charge on the timing capacitor reaches a predetermined level, thereby causing the transistor amplifier to become saturated and the second and third transistor means to be cut off; and delay means comprising a fourth resistor coupled across the timing capacitor for providing a delay in reaching the predetermined level of charge on the timing capacitor, and a second diode means coupled to the timing capacitor and to the latching means for providing a quick discharge path for the capacitor when the DC voltage source is disconnected from the input terminal.

2. A voltage supply as recited in claim 1 and further including a fifth resistor means coupled between the base of the first transistor means and the first diode means for protecting the first transistor means from overload voltage.

3. A voltage supply as recited in claim 1 wherein the first diode means is a Zener diode.

4. A voltage supply as recited in claim 1 wherein the sensing resistor is a very low value resistor.

* * * * *